Sept. 10, 1940.   J. H. ADAMS   2,214,217
MARSHMALLOW CUTTER
Filed Sept. 21, 1939   2 Sheets-Sheet 1
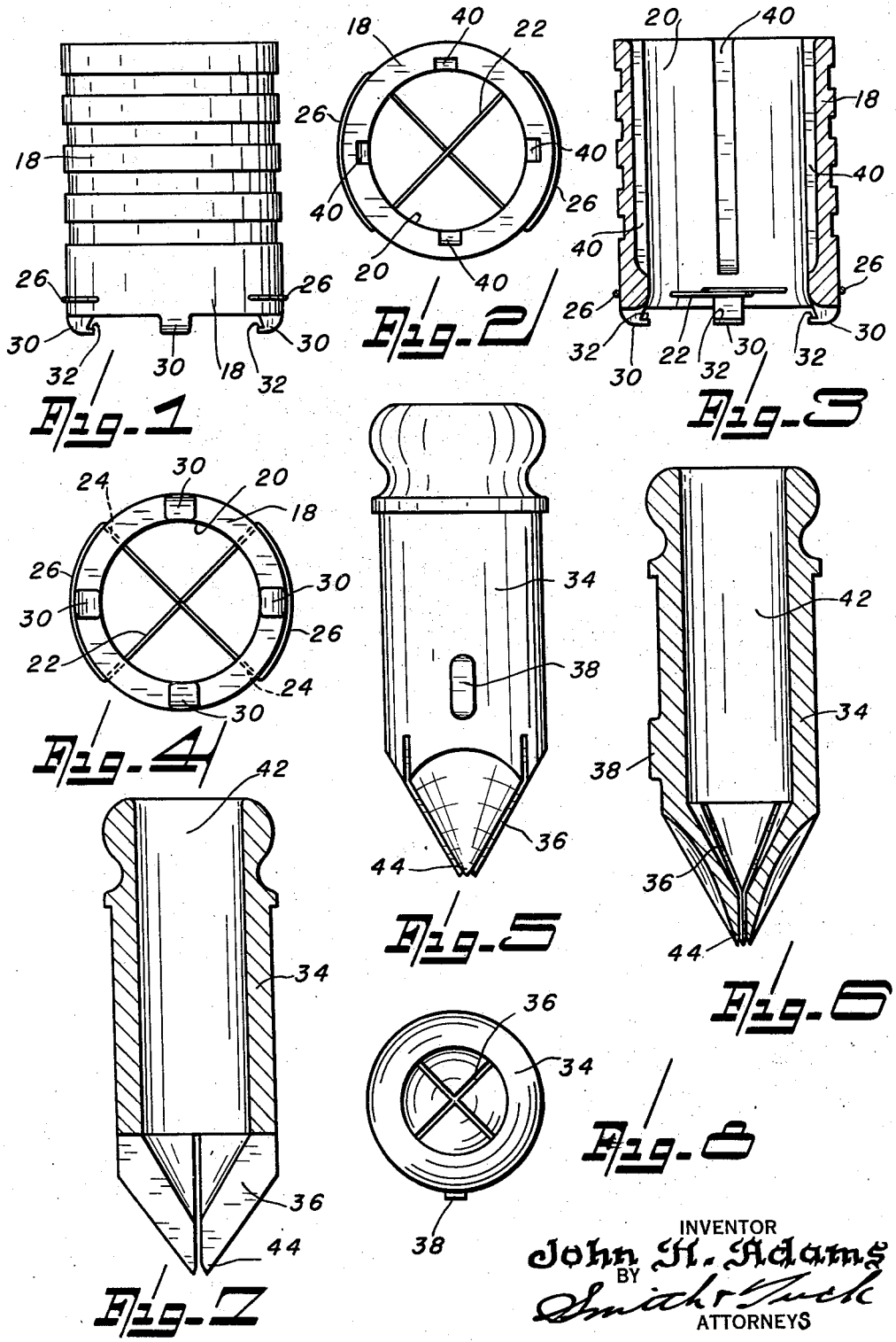
INVENTOR
John H. Adams
BY
ATTORNEYS Sept. 10, 1940.  J. H. ADAMS  2,214,217
MARSHMALLOW CUTTER
Filed Sept. 21, 1939  2 Sheets-Sheet 2
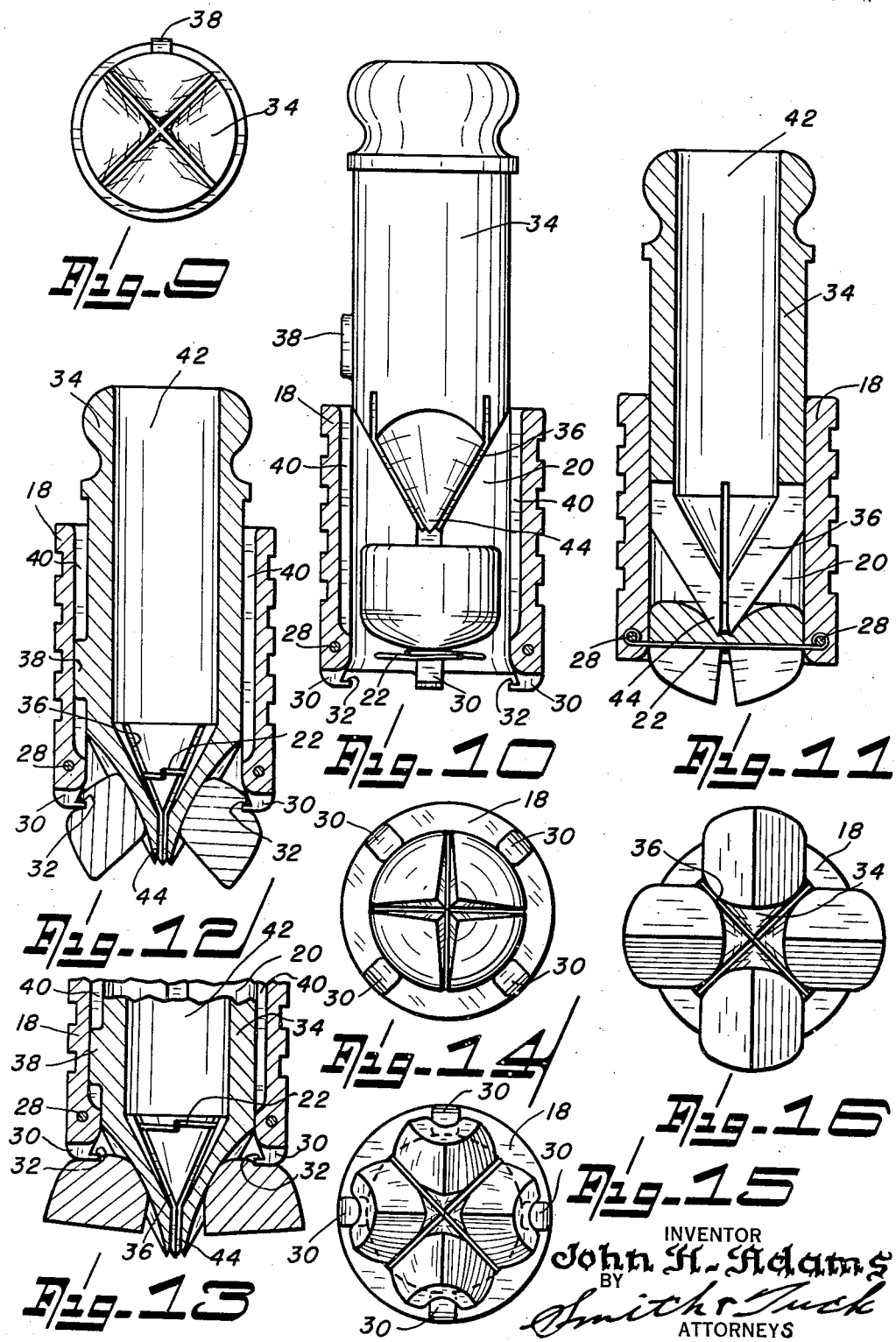
INVENTOR
John H. Adams
BY
Smith & Tuck
ATTORNEYS Patented Sept. 10, 1940

2,214,217

UNITED STATES PATENT OFFICE 2,214,217

MARSHMALLOW CUTTER

John H. Adams, Seattle, Wash.

Application September 21, 1939, Serial No. 295,982

6 Claims. (Cl. 107—47)

My present invention relates to the art of kitchen or culinary utensils and more particularly to a marshmallow cutter.

My device consists essentially of a cylindrical block provided with a bore having one or more wires disposed across its end together with a coacting plunger adapted to slide within the bore so as to force the marshmallow or other like food product past the wires and thereby cut the marshmallow into two pieces for each wire so used. In order to make such a device operate effectively the plunger is arranged so that it forces past the wires first, the center of the marshmallow, and then, as the piston advances, the remainder of the marshmallow is forced past the wires so as to produce a slicing action; this slicing action is further promoted by hook-like lugs which tend to roll the cut portions of the marshmallow away from each other so as to force the continuation of the slicing action.

The principal object of my invention is, therefore, to provide means for the convenient cutting of a marshmallow into a plurality of pieces, each substantially the same size, and to accomplish this action in a manner to prevent the exposure of any of the cut surfaces to the working parts of the device so as to avoid all danger of small particles adhering to the device at any point and building up to a degree that will affect the operation of the cutter.

A further object of my invention is to provide means that will produce, in effect, a slicing cut of a marshmallow so that the powdery outer, protective covering will be used to insure that the marshmallow center will not come into contact with any portion of the device excepting the cutting wires to the end that the device will be kept clean.

Another important object of my invention is to provide means for holding the cut portions of the marshmallow to the cutting device until the piston is withdrawn to the end that this action will make it possible for a housewife, for instance, to place the cut pieces of the marshmallow in their final resting place, particularly when the marshmallow is used as a decorative additive to a dessert or the like.

Still another object of my invention is to provide means whereby the cutting wires can be, to a degree at least, self-cleaning; the whole device is so arranged that cleaning of the same is reduced to a minimum, and the housewife's purpose is truly served without causing her undue work in cleaning the utensil after she is through with it, thus overcoming the usual objections to devices of this order.

Other and more specific objects will be apparent from the following description taken in connection with the accompanying drawings, wherein:

Figure 1 is a side elevation of the cylinder of my device.

Figure 2 is a top plan view of Figure 1.

Figure 3 is a vertical, sectional view taken in the same sense as Figure 1.

Figure 4 is a bottom plan view of the cylinder of Figure 1.

Figure 5 is a side elevation of the piston used with my device.

Figure 6 is a longitudinal sectional view taken through the device of Figure 5 and taken in the same sense.

Figure 7 is a vertical, sectional view similar to Figure 6 excepting that the cutting plane has been revolved ninety degrees.

Figure 8 is a top plan view of Figure 5.

Figure 9 is a bottom plan view of Figure 5.

Figures 10, 11, 12, and 13 are vertical, sectional views showing the sequence of steps in the cutting of a marshmallow.

Figures 14, 15, and 16 are bottom plan views, respectively, of Figures 11, 12, and 13.

Referring to the drawings, throughout which like reference characters indicate like parts, numeral 18 designates the cylinder of my device. This may be made of any suitable material; at present molded plastic seems to be the most desirable, as there is a marked freedom of adhesion between the marshmallow material and the plastic. The cylinder provided with a bore 20 of a diameter sufficient so that a marshmallow may be dropped freely down the bore until it rests upon the diametrically disposed cutting wires 22. The number of these cutting wires is a matter of election; it is to be understood that for each diametrically disposed wire so used, two pieces of marshmallow will result. For the majority of purposes it has been found that the standard size marshmallow, if cut into four parts, provides the sized segments most commonly used by the housewife or cook, although six or eight pieces may be provided for if desired. These wires are preferably of relatively small gauge so that they will offer but little resistance as the marshmallow is passed over them, to the end that they will act more as a knife and will not have sufficient body so that any substantial amount of the marshmallow material will adhere thereto. The wires must, of necessity, be stretched tightly across the bore; this may be accomplished as is shown in Figures 1 to 4, inclusive, by passing the wires through openings as at 24 in the cylinder and then passing it around the segment of the cylinder at 26 and then back through another set of diametrically disposed holes. In certain cases, however, and especially in molding the cylinder of plastic, it has been found desirable to form the cross wires by wrapping them around a ring 28, of increased diameter, so that the cross-wires as a unit may be inserted into the mold and the plastic molded around the same, thereby holding them securely in place. At the extreme end, adjacent the cutting wire, are provided a plurality of outstanding lugs 30. These lugs, of which there should be one for each segment of the marshmallow cut, are arranged so as to arrest the movement of the marshmallow segments and to assist in causing a rolling action so that a slicing of the marshmallow is accomplished by the wire. To assure this action it has been found desirable to slightly undercut these lugs as at 32.

Adapted for insertion into bore 20 is the piston member 34. The clearance between the piston and the cylinder is just sufficient so that easy action is obtained. The end of the piston which comes into coaction with the wires is pointed after the showing of the various views, and in order that the slicing action may be fully taken advantage of, a diametrically disposed slot as 36 is provided to accommodate each of the cross-wires 22 so that the piston can advance to the point where the wires will be fully enclosed within the piston and thus assure a complete severance of the marshmallow segment. It is necessary to provide means for the accurate matching up of slots 36 with the cross-wires 22 and it has been found that a very convenient means is to provide one or more outstanding lugs as 38 formed as part of piston 34 and to further provide in bore 20 of the cylinder, grooves as 40 adapted to receive these lugs so that as the piston is inserted into the cylinder it will be relatively easy for the operator to engage lugs 38 in guideways or grooves 40 so that the cylinder will be accurately guided and the wires 22 centered within slots 36. Inasmuch as some marshmallow material will collect upon wires 22 and thereby be drawn into slot 36, it has been found desirable to provide piston 34 with an interior bore 42 to the end that hot water, for instance, can be passed through the bore and as it starts out through slot 36 it will clean out any other material that may have been lodged in the slot.

It has been found, further, that if the pointed end of piston 34, instead of being formed as a pyramid with plane sides, is formed with concave sides after the showing of the various views, that the marshmallow will tend to follow these curved surfaces and will, because of the positioning of wire 22, tend to tear as the marshmallow is passed over the wires so that the cutting action might be likened to cutting sponge rubber, for instance, when the rubber is stretched before the knife is drawn across it.

Method of operation

In using my marshmallow cutter, it has been found more practical to merely drop the marshmallow into bore 20 until it rests upon wires 22, after the showing of Figure 10. Piston 34 is then pressed downward on the marshmallow after the showing of Figures 11, 12, and 13. It will be noted that the first contact is made at the point 44 of piston 34 so that cutting is started at the center of the marshmallow, and then as the piston is pressed further through the bore, a distinct slicing action is accomplished by the wires in that the marshmallow tends to conform to the shape of the concave surfaces of piston 34. Consequently the cutting action is progressive and, after the point 44 has forced the marshmallow past the intersection of the crosswires, the cutting action is broken up into four distinct cutting actions. The final stage is shown in Figure 12. During this action the undercut portions 32 of lugs 30 engage the outer surfaces of the marshmallow so as to roll it as the piston is pressed downwardly, until finally the wires have passed entirely through the marshmallow, cutting it into four parts by means of the two cross-wires as illustrated. The friction of the marshmallow is sufficient to hold the parts, after the showing of Figure 13, in the device so that the housewife can place the four parts on that portion of dessert or serving where they are desired, and by withdrawing the piston slightly the four parts will drop off as distinct, fully cut segments. This is a matter of great convenience in that, after the marshmallow has been cut, each segment then presents two surfaces that do not have the powdered dressing and if touched by the hands or by any instrument the sticky surfaces will adhere thereto. However, with the present arrangement the only surfaces presented to either the piston or to the cylinder are the powder-coated surfaces and the only part of the device that comes in contact with the soft center portion of the marshmallow is the relatively fine wires which are too small for any amount of the material to adhere to. If, however, small amounts do adhere to the same, they are wiped off in slots 36 in each successive operation of the device and then after the required number of marshmallows have been cut a flushing through bore 42 will thoroughly clean the same and a similar flushing of the cylinder bore will wash off the wires any of the small particles that may have adhered thereto.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. In a marshmallow cutter, the combination with a receptacle having a pair of crossed-wires adjacent one of its open ends, of a reciprocal plunger and co-acting centering means on the receptacle and plunger, and said plunger having a tapered head and cruciform slots therein for co-action with the crossed cutting-wires.

2. In a marshmallow cutter, the combination with a cylindrical receptacle having a cutting-wire adjacent one of its open ends, of a combined reciprocal plunger-and-ejector having a head slotted for co-action with said cutting wire, and co-acting centering means on the interior of the receptacle and the exterior of the plunger-and-ejector for guiding the latter.

3. In a marshmallow cutter, the combination with a receptacle having a wire-cutter adjacent one of its open ends, of a reciprocal plunger having a tapered ejecting-head slotted to conform to the wire-cutter, said receptacle having an interior longitudinally extending groove, and said plunger having an exterior lug movable in the groove.

4. In a marshmallow cutter, the combination with a cylindrical receptacle having a wire-cutter adjacent one of its open ends, of a cylindrical reciprocal plunger having a hollow tapered ejecting head slotted to conform to said wire-cutter, said receptacle having an inner longitudinal guide groove, and said plunger having an exterior lug movable in said groove.

5. In a marshmallow cutter, the combination with a receptacle, a wire-cutter disposed transversely in one open end of the receptacle, and retaining lugs mounted on said open end, of a reciprocable plunger, co-acting centering means on the receptacle and plunger for guiding the latter, a tapered ejecting head on the plunger having slots complementary to said wire cutter, and said tapered head also having concave faces opposite said lugs, whereby the cut and ejected segments of the mushroom are retained until the plunger is withdrawn from cutting position.

6. In a marshmallow cutter, the combination with a receptacle, and a wire cutter mounted in one of the open ends of the receptacle, of tubular reciprocable plunger, co-acting centering means on the receptacle and plunger for guiding the latter, a hollow tapered ejecting head on the plunger having slots complementary to the wire cutter, and co-acting means on the receptacle and plunger for retaining cut and ejected segments until the plunger is withdrawn from cutting position.

JOHN H. ADAMS.